(No Model.)  
W. F. PARISH.  
CIRCULAR SAW MILL.  
No. 349,356. Patented Sept. 21, 1886.
3 Sheets—Sheet 2.
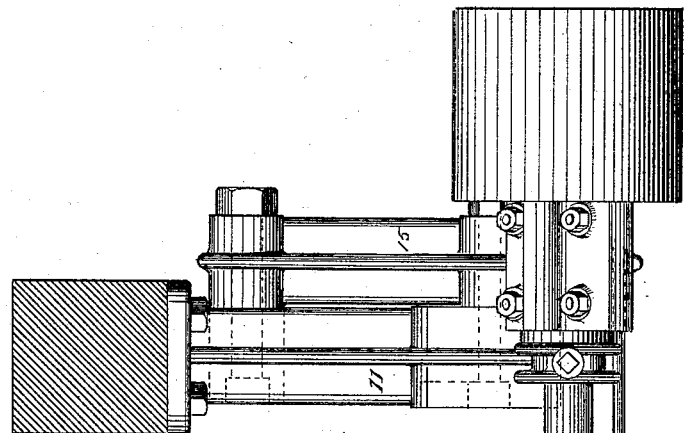
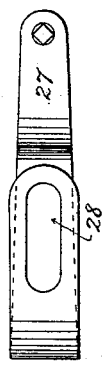
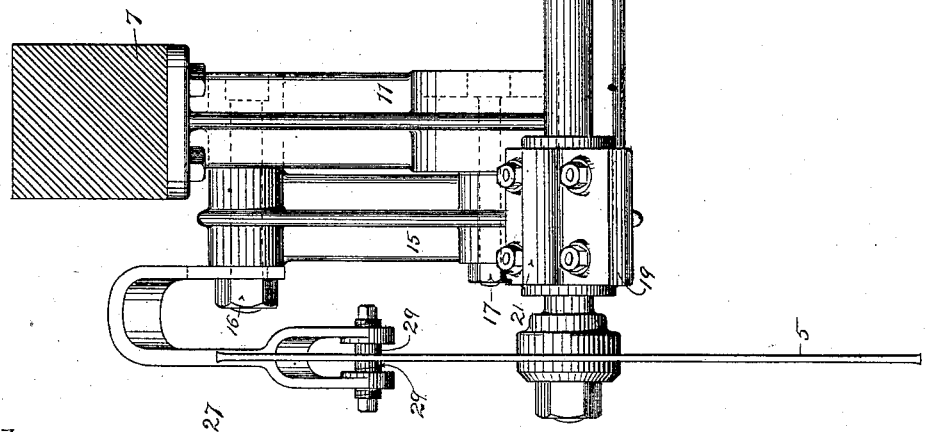
Witnesses  
A. C. Paul  
R. H. Sanford.
Inventor  
William F. Parish (No Model.) 3 Sheets—Sheet 3.

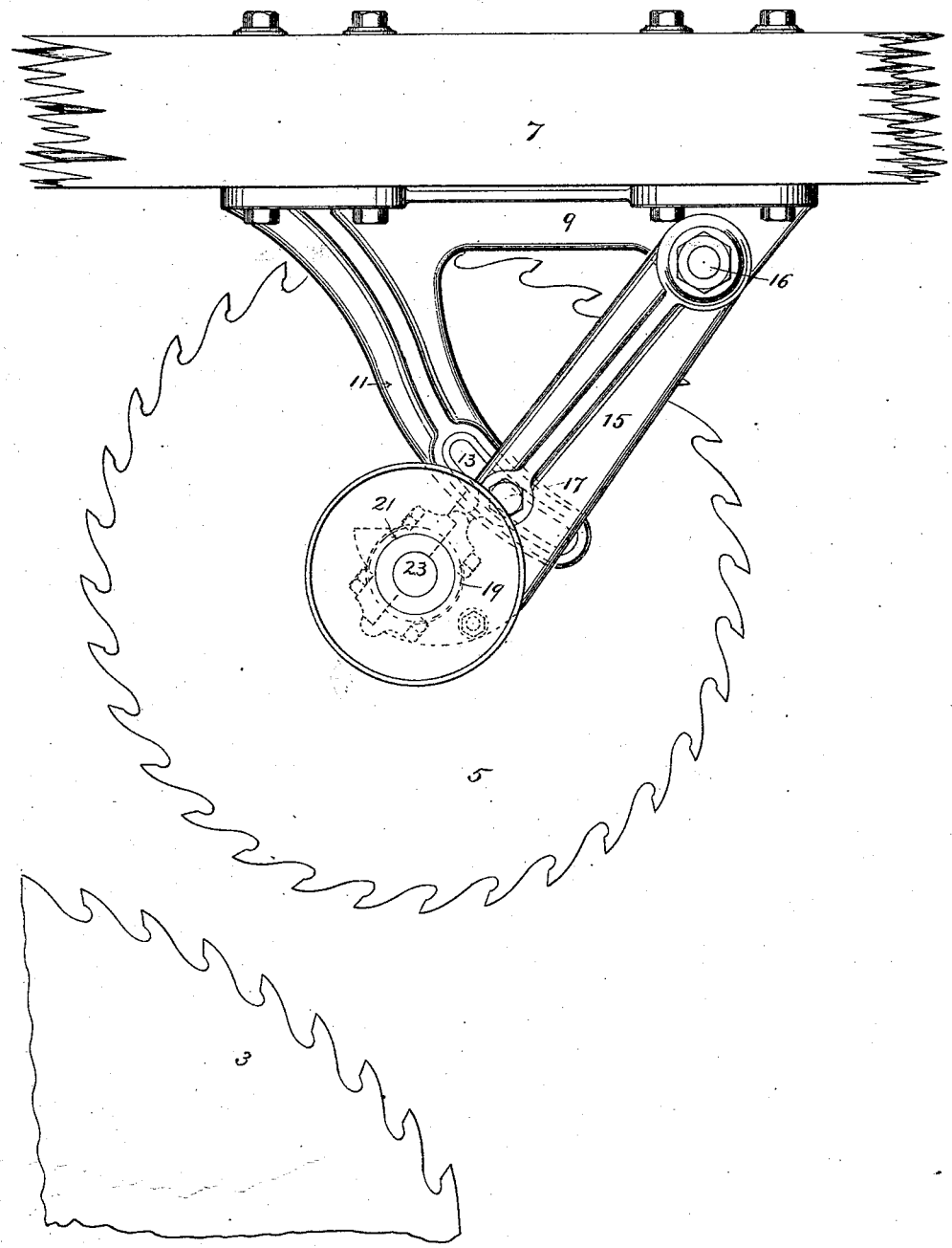

W. F. PARISH.
CIRCULAR SAW MILL.

No. 349,356. Patented Sept. 21, 1886.

Witnesses
A. C. Paul
R. H. Sanford.

Inventor
William F. Parish

UNITED STATES PATENT OFFICE.

WILLIAM F. PARISH, OF MINNEAPOLIS, MINNESOTA.

CIRCULAR-SAW MILL.

SPECIFICATION forming part of Letters Patent No. 349,356, dated September 21, 1886.

Application filed May 3, 1886. Serial No. 200,950. (No model.)

*To all whom it may concern:*

Be it known that I, WILLIAM F. PARISH, of Minneapolis, in the county of Hennepin, State of Minnesota, have invented certain Improvements in Top Saws for Circular-Saw Mills, of which the following is a specification.

This invention relates to improvements in means for supporting and adjusting top saws for circular-saw mills; and the object I have in view is to provide an improved construction by which the top saw of a circular-saw mill is adjustably supported in an independent overhead frame.

The invention consists, generally, in the construction and combination hereinafter described, and particularly pointed out in the claims.

Figure 3:
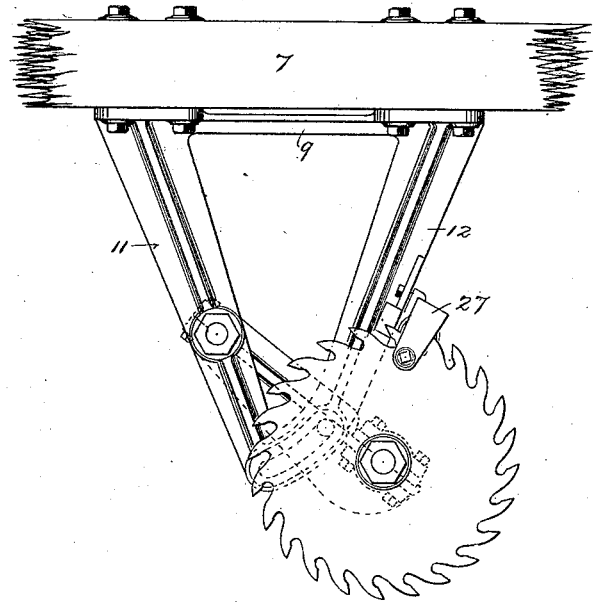
Figure 4:
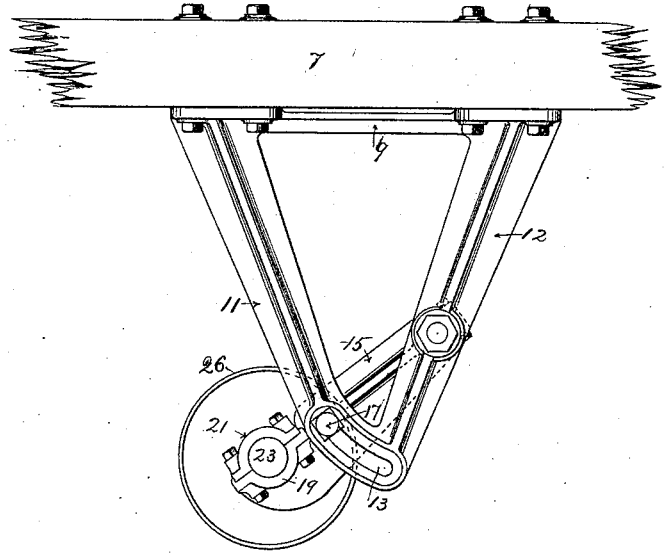

In the drawings forming part of this specification, Figure 1 is a side elevation of a top saw and supporting means, with a portion of the lower or main saw, showing the relative arrangement of the two. Fig. 2 is a front elevation of the top saw and supporting means. Figs. 3 and 4 are elevations of the opposite ends of a supporting-frame of modified construction. Fig. 5 is a detail of the guide.

In the drawings, 3, Fig. 1, represents a portion of the lower saw of the mill.

5 represents the top saw, which is supported above the saw 3 in the same plane, the relative position of the two saws being substantially as shown in Fig. 1.

Secured to suitable timbers or supports, 7, above the saw-frame are independent frames or hangers, which support the top saw. These hangers are usually cast in one piece, and consist of a plate, 9, that is bolted to the timber 7, and an arm, 11, depending at an angle to the plate, and having near its lower end a curved slot, 13. Pivoted to the opposite end of the plate 9 is an arm, 15, that is provided with a bolt, 17, that passes through the slot 13 in the arm 11. This arm projects below the arm 11, and has in its lower end a suitable journal-box, 19, that is provided with a cap, 21, bolted thereto.

The saw 5 is secured to an arbor, 23, having a driving-pulley, 26. This arbor is mounted in the boxes 19 on the arms 15. These pivoted arms and the saw-arbor form a swinging frame, by which the saw is adjusted. This frame may be further stiffened and braced by a tie-rod, 25, which passes through the arms 15, and also causes these arms to move together when being adjusted.

When in readiness for operation, the arms 15 are bolted firmly to the arms 11. The pivoted arm 15, the plate 7, and the depending arm 11 are braced against each other and rigidly secured together. By loosening the bolts 17 the pivoted arms 15 may be raised or lowered, and thereby the top saw may be adjusted up or down toward or from the main or lower saw.

In some instances I prefer to connect the plate 9 and the lower end of the arm 11 by an arm, 12, preferably cast in one piece as a triangular frame. (See Figs. 3 and 4.) In this case the arms 15 may be pivoted to the arm 12 at any suitable point below the plate 9. The arms 15 are provided with bolts 17, which pass through the curved slots 13, as already described. With this construction and arrangement the top saw is supported entirely independent of the main frame of the machine, and this supporting-frame, being above the saw, is entirely out of the way, and the sawyer can watch the carriage without his vision being obstructed by the frame of the top saw, which is not the case with the machines in which this saw is supported in a frame that is mounted on the main frame of the machine. I also provide a guide for the top saw, which consists of a curved bar, 27, having a slot, 28, therein, by which the guide is held on the pivot-bolt 16 of the arms 15. The guide has preferably a forked end provided with bearing-blocks 29, between which the saw passes. The position of the guide may be adjusted by turning or moving it on its pivot as the position of the saw is changed.

I claim as my invention—

1. The combination, with a circular saw, of an independent swinging overhead frame, a top saw mounted on said swinging frame, and a depending arm or hanger, to which said swinging frame is adjustably secured at a point between its pivot and the saw-arbor, substantially as described.

2. The combination, in a circular-saw mill, of the overhead swinging frame with the top saw mounted thereon, the independent slotted arms 11, and the bolts adjustably securing said swinging frame to said depending arms, all substantially as described.

3. The combination, in a circular-saw mill, of the plates 9, the depending arms projecting at an angle therefrom and provided with the slots 13, the pivoted arms 15, having the bolts 17 passing through the slots 13, the arbor mounted on said pivoted arms, and the saw 5 on said arbor, substantially as described.

4. The combination of the plates 9, the arms 11, projecting downwardly therefrom, and having the slots 13 therein, the arms 15, pivoted to the plates 9, the bolts 17, passing through said slots 13, the arbor, and saw, all substantially as described.

5. The combination, with the top saw, mounted on the pivoted arms 15, of the curved bar 27, adjustably secured upon the pivot-bolt 16, and having the forked end with bearing-blocks 29 upon the opposite sides of the saw, substantially as described.

In testimony whereof I have hereunto set my hand this 29th day of April, 1886.

WILLIAM F. PARISH.

In presence of—
A. C. PAUL,
RICHARD PAUL.